United States Patent [19]
Akira

[11] Patent Number: 5,574,529
[45] Date of Patent: Nov. 12, 1996

[54] METHOD OF INSPECTING A NEGATIVE FILM IN A PHOTOGRAPHIC PROCESSING APPARATUS

[75] Inventor: Toshiro Akira, Wakayama, Japan

[73] Assignee: Noritsu Koki Co., Ltd., Wakayama, Japan

[21] Appl. No.: 412,153

[22] Filed: Mar. 28, 1995

[30] Foreign Application Priority Data

Mar. 28, 1994 [JP] Japan .................................. 6-057705

[51] Int. Cl.⁶ .............................. G03D 3/08; G03D 13/00
[52] U.S. Cl. ................. 396/568; 250/559.4; 250/559.44; 226/10; 355/75; 396/620
[58] Field of Search .......................... 354/298, 319–321; 355/40, 41, 75, 206, 308; 250/559.42, 559.43, 559.44, 559.4, 557, 570; 73/157, 159; 226/9–11; 356/430

[56] References Cited

U.S. PATENT DOCUMENTS

| | | | |
|---|---|---|---|
| 3,501,760 | 3/1970 | Menary | 242/584.1 |
| 3,693,430 | 9/1972 | Menary | 73/157 |
| 3,856,414 | 12/1974 | Menary | 250/559.42 |
| 4,320,960 | 3/1982 | Ward et al. | 355/75 |
| 4,933,713 | 6/1990 | Tsuji et al. | 355/41 |

*Primary Examiner*—D. Rutledge
*Attorney, Agent, or Firm*—Wenderoth, Lind & Ponack

[57] ABSTRACT

A method of inspecting a negative film in a photographic processing apparatus includes the steps of using a detector to detect location data (i.e., preforations) arranged at equal intervals on the negative film, electrically comparing the detected location data with equally distanced reference location data having a regularity and assigned to a standard negative film, and automatically stopping the advancing movement of the negative film upon finding a fault in the regularity of the detected location data.

1 Claim, 2 Drawing Sheets

METHOD OF INSPECTING A NEGATIVE FILM IN A PHOTOGRAPHIC PROCESSING APPARATUS

BACKGROUND OF THE INVENTION

The present invention relates to a method of inspecting a negative film (referred to as a negative hereinafter) in a photographic processing apparatus.

It is known that a negative may be jammed and damaged during the advancing movement along a film passage in a photographic processing apparatus when it has a defect such as a slit adjacent to a perforation.

For preventing such an incident, the negatives are visually inspected one-by-one by an operator being loaded into the photographic processing apparatus. If any defective negative is found, it is reclaimed or repaired to ease the advancing movement along the apparatus film passage.

The visual inspection of the negatives is a troublesome task having very low efficiency, and misjudgment possible omission of a defect. If any defective film is loaded through possible omission of a defect, misjudgment, or fault action of a drive system in the film passage, it will be jammed and damaged causing cancellation of the printing process.

It is thus essential to stop the advancing movement immediately and remove the defective negative from the film passage by manual action of the operator upon jamming of the defective negative. This obligates the operator to pay constant attention to the advancing movement of the negative film to prevent generation of a troublesome situation. In addition, the inspection process for identifying any defect on the negative is not easy and requires a level of skill. It has been much desired to develop a technique for elimination of such a disadvantage.

It is an object of the present invention, in view of the foregoing, to provide a method of inspecting a negative for slits or cuts without visual checking of a service person or operator so that any defective negative film is exactly identified and prevented from loading into the film passage of a photographic processing apparatus.

SUMMARY OF THE INVENTION

For achievement of the object of the present invention, a method of inspecting a negative film in a photographic processing apparatus comprises the steps of using a detector to detect location data arranged at equal intervals on the negative film, electrically comparing the detected location data with equally distanced reference location data having a regularity and assigned to a standard negative film, and automatically stopping the advancing movement of the negative film upon finding a fault in the regularity of the detected location data.

According to the inspection method of the present invention, the location data arranged at equal intervals on the negative film in the form of, for example, perforations are electrically measured or monitored and electrically compared with the equally distanced reference location data which have a regularity and are arranged on the standard film. If a fault in the regularity of the measured location data on the negative film is found, it is judged that there is at least a slit adjacent to one of the perforations or any obstruction in the same. In response such a judgment, the advancing movement of the negative film is systematically stopped to prevent any damage to the film and the apparatus.

DETAILED DESCRIPTION OF THE PREFERRED EMBODIMENT

One preferred embodiment of the present invention will be described below referring to the accompanying drawings.

Figure 1:
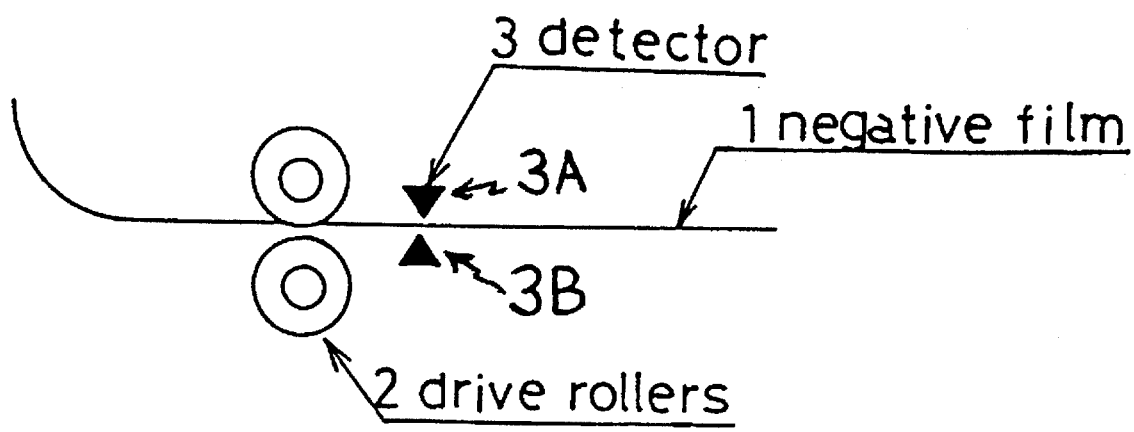
FIG. 1 is a schematic explanatory view showing the inspecting a negative during the advancing movement according to the present invention.
Figure 2:
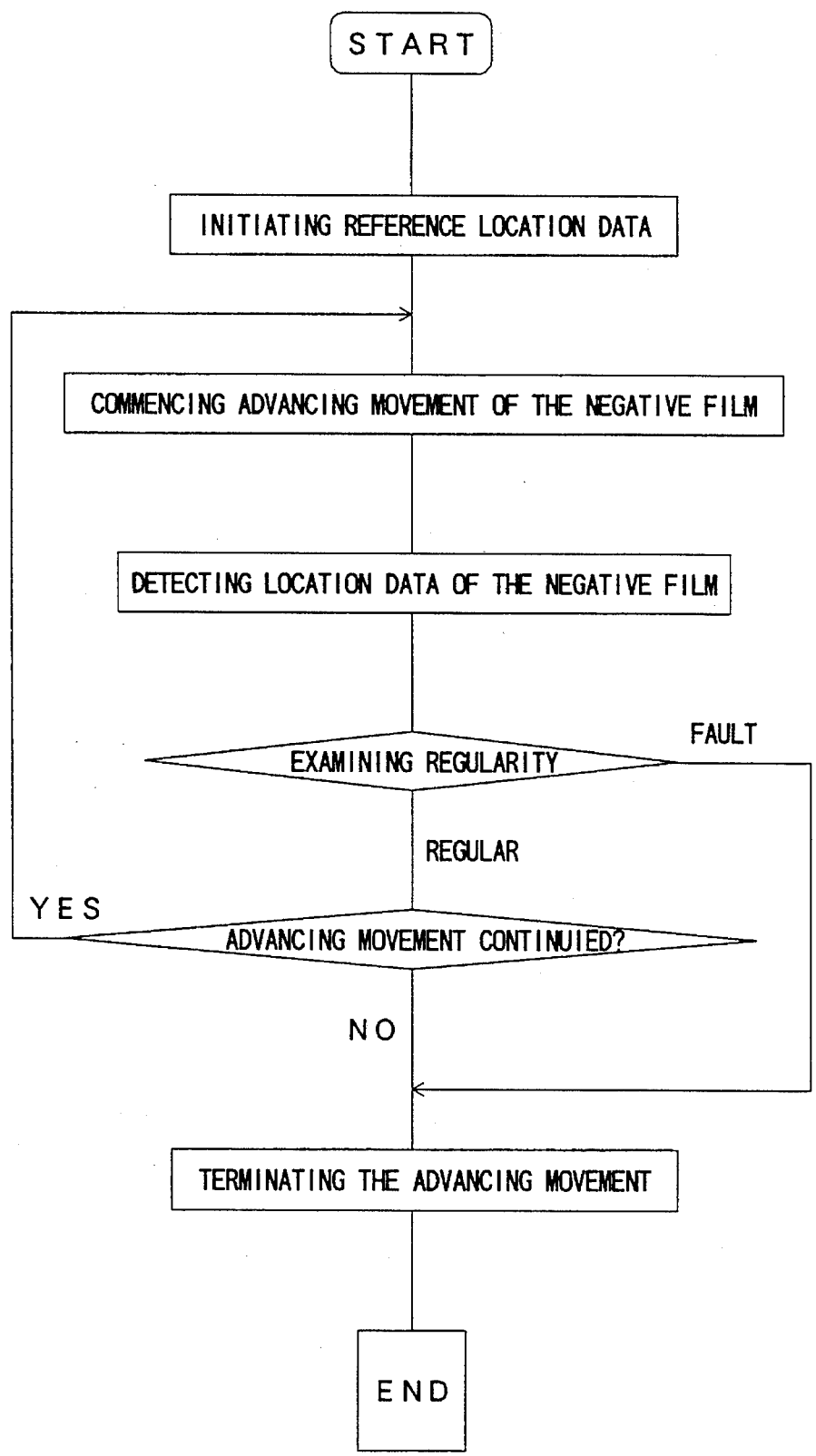
FIG. 2 is a flow chart of the procedure of inspecting the negative for a defect.

As shown in FIG. 1, a negative film 1 is continuously advanced by the action of drive rollers 2 towards a detector 3 which electrically examines whether or not the negative 1 has a defect such as a slit adjacent to a perforation. FIG. 2 is a flow chart showing a procedure of the examination. As reference location data arranged at equal intervals on a standard negative are initiated having a degree of regularity, the advancing movement of the negative 1 is commenced. The detector 3 includes two parts 3A and 3B positioned on opposite sites of the negative 1. Location data arranged on the negative 1 are detected by the detector 3 and transmitted to a comparator (not shown) where it is electrically compared with the reference location data. More specifically, it is examined whether or not the location data on the negative 1 is identical or in regularity to the reference location data of the standard negative. If a fault in the regularity of the location data is found, the advancing movement of the negative 1 is terminated. When the regularity is acceptable, it is further examined whether the advancing movement of the negative 1 is continued or not before restarting the advancing movement.

In more detail, the location data arranged on the negative 1 are provided in the form of a row of perforations which are aligned at equal intervals of a given distance as sized in a physical manner for detection with the detector 3. As the perforations pass the detector 3, the distance between any two adjacent perforations is detected (or measured) and examined (or monitored) by a computer. The distance data are then compared with the reference data for examining the regularity of the perforations. If any fault in the regularity is found, it is judged that there is a slit adjacent to one of the perforations in the negative 1 or an obstruction trapped in the perforation. Accordingly, the advancing movement of the negative 1 is automatically terminated to prevent any damage to the negative 1. The detector 3 may be a known perforation detector or the like which allows the negative 1 to be transferred to an appropriate location before canceling the advancing movement.

What is claimed is:

1. A method of inspecting a negative film in a photographic processing apparatus, the negative film having regularly spaced perforations along a length thereof, said method comprising the steps of:

conveying the photographic film lengthwise between first and second parts of a perforation detector, the first and second parts being located on opposite sites of the negative film as the negative film is conveyed lengthwise therebetween;

using the perforation detector to obtain location data indicative of a detected distance between successive perforations of the negative film as detected by the perforation detector;

electrically comparing the location data with reference location data indicative of a distance between regularly spaced perforations of a standard negative film; and automatically stopping the conveying of the negative film upon finding a fault in a regularity of the detected location data as compared to the reference location data.

\* \* \* \* \*